C. C. STRANGE & J. M. HOBEN.
GRAIN ELEVATOR.
APPLICATION FILED APR. 20, 1910.
980,699.
Patented Jan. 3, 1911.
3 SHEETS—SHEET 3.
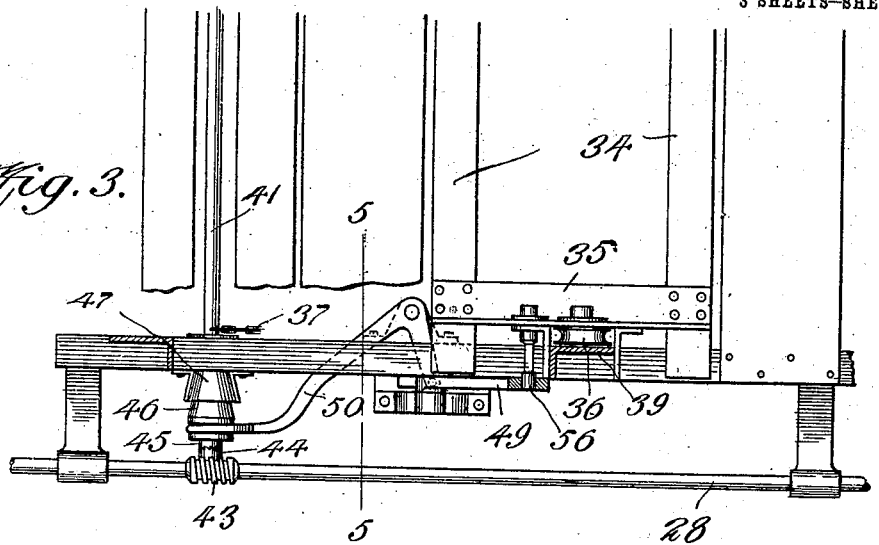
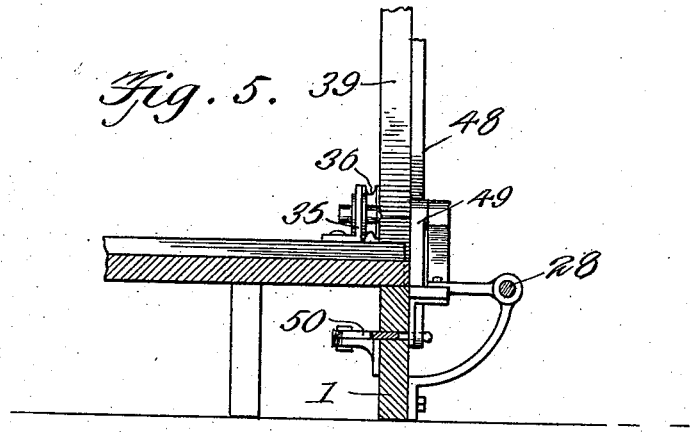
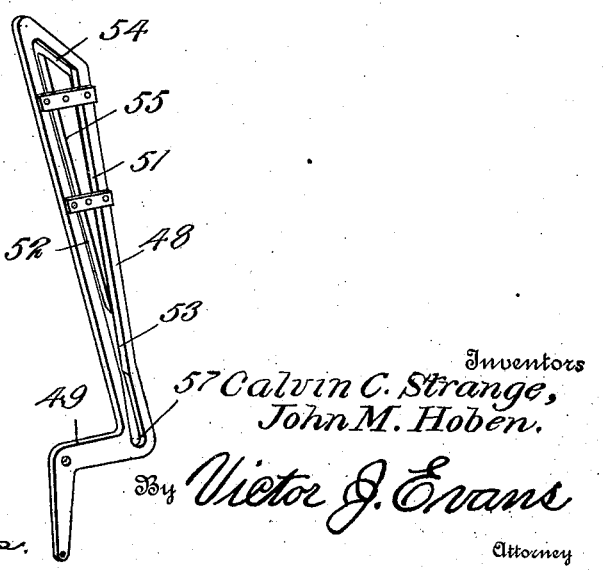
Witnesses
Frank B. Hoffman
C. C. Hines
Inventors
Calvin C. Strange,
John M. Hoben.
By Victor J. Evans
Attorney

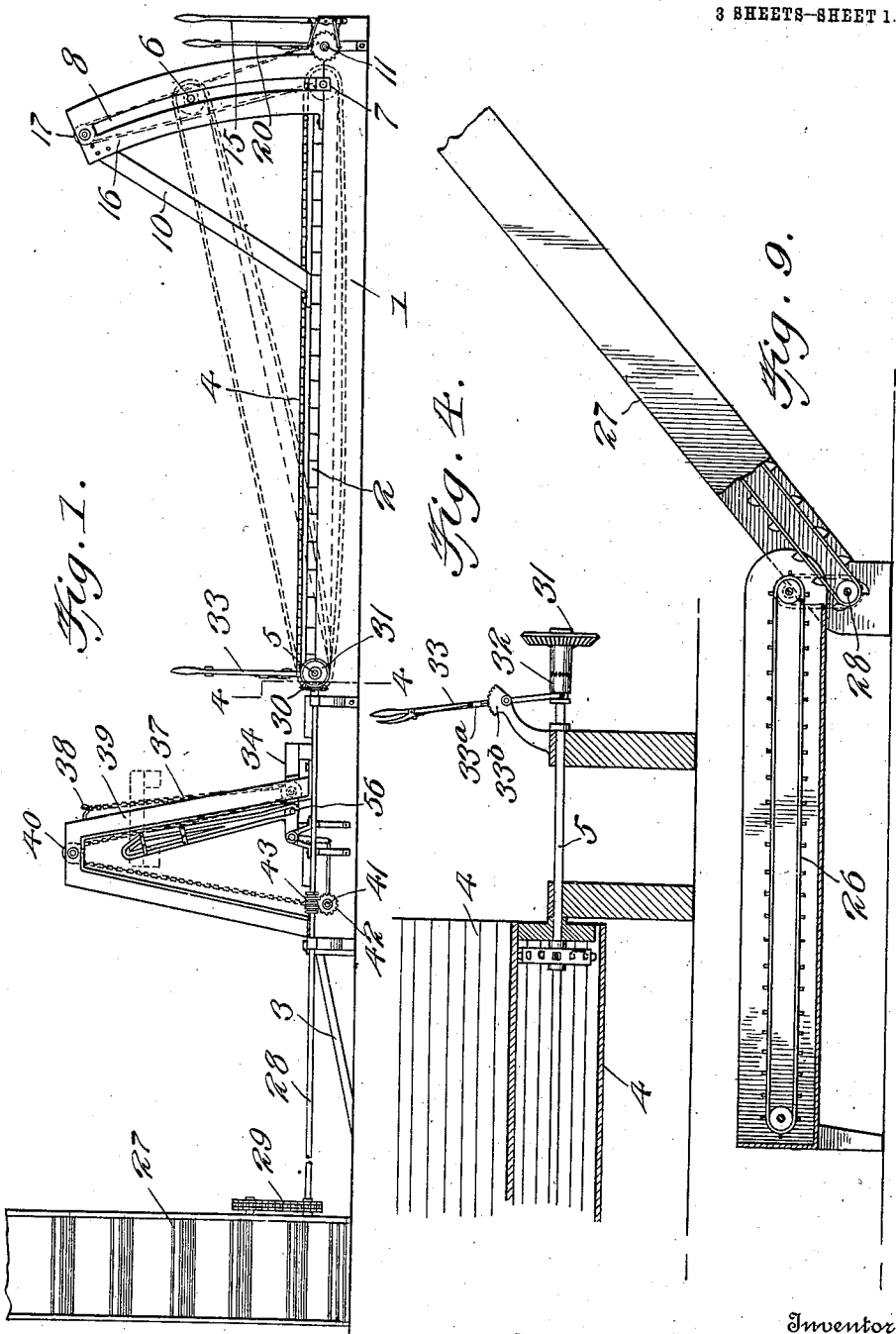

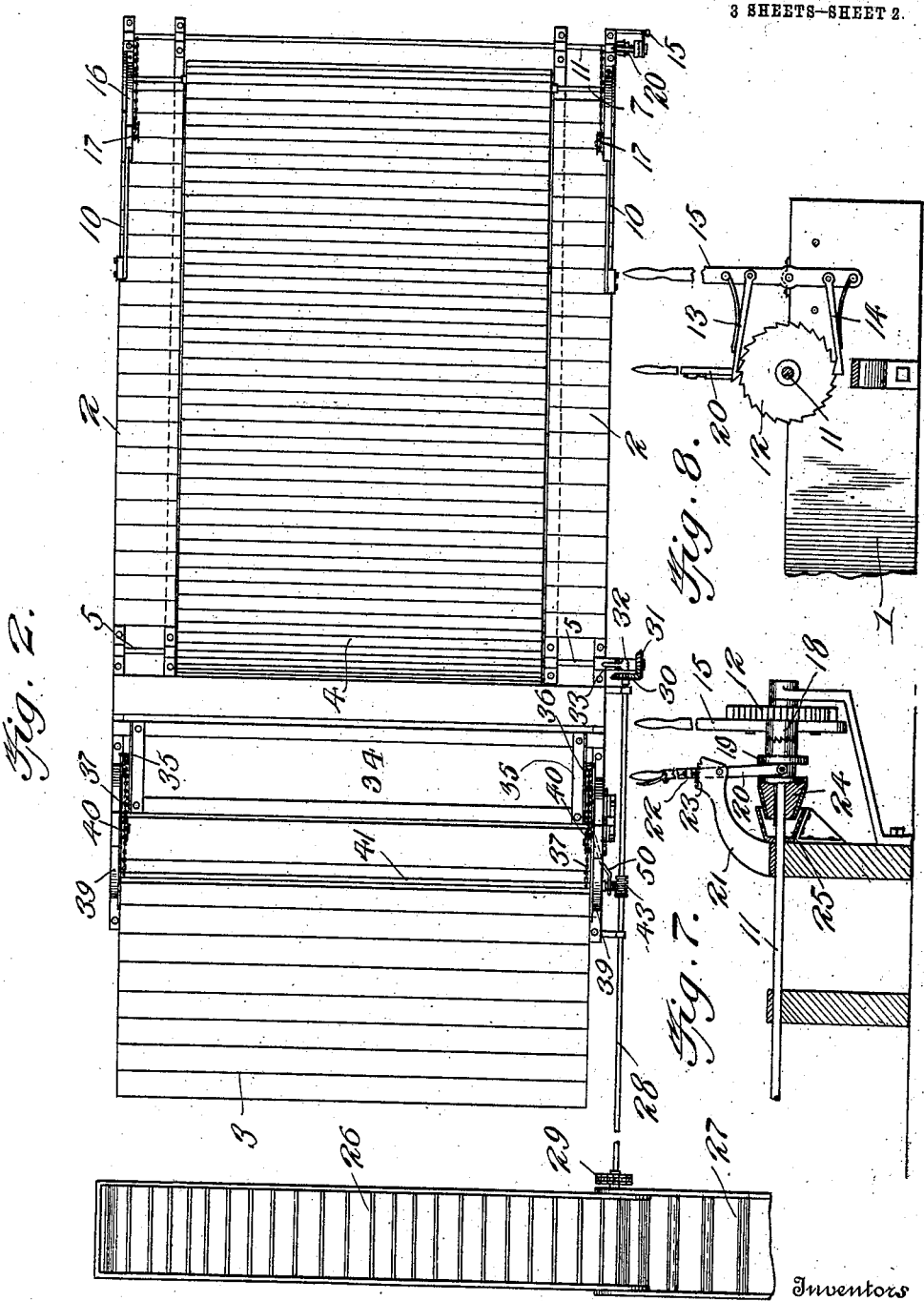

UNITED STATES PATENT OFFICE.

CALVIN C. STRANGE AND JOHN M. HOBEN, OF GALESBURG, ILLINOIS.

GRAIN-ELEVATOR.

980,699.  Specification of Letters Patent.  Patented Jan. 3, 1911.

Application filed April 20, 1910. Serial No. 556,500.

*To all whom it may concern:*

Be it known that we, CALVIN C. STRANGE and JOHN M. HOBEN, citizens of the United States, residing at Galesburg, in the county of Knox and State of Illinois, have invented new and useful Improvements in Grain-Elevators, of which the following is a specification.

This invention relates to portable grain elevators of the tread-mill operated type, the object of the invention being to provide a simple, strong and compact apparatus of this character which can be conveniently stored and transported and whose operating parts may be readily controlled, and whereby the power of the draft animals may be utilized to elevate a loaded wagon to discharging position.

The invention consists of the features of construction, combination and arrangement of devices hereinafter fully described and claimed, reference being had to the accompanying drawings, in which:—

Figure 1 is a view in side elevation of a grain elevator embodying our invention. Fig. 2 is a top plan view of the same. Fig. 3 is a sectional plan view on an enlarged scale, showing particularly the clutch and brake mechanism controlling the movable platform. Fig. 4 is a detail cross section on the line 4—4 of Fig. 1. Fig. 5 is a detail cross section on the line 5—5 of Fig. 3. Fig. 6 is a perspective view of the cam lever. Fig. 7 is a view partially in elevation and partially in cross section of the means for raising and controlling the descent of the tread-mill. Fig. 8 is a side elevation of the same. Fig. 9 is a sectional elevation of the conveyers.

The implement comprises a suitable frame, including suitable longitudinal side bar or sills 1 connected and braced by any suitable construction and arrangement of cross pieces. The forward portion of this frame is open and provided at opposite sides with fixed longitudinal platform sections 2 on which the attendant in charge of the draft animals may stand. At the rear end of the frame is arranged an inclined platform or approach, up which the team of draft animals travel to the tread-mill and to dispose the front portion of the wagon carrying the grain to be dumped in operative position upon the rear of the frame.

The tread-mill comprises an endless belt 4 provided with the usual transverse cross cleats and arranged to travel at its ends around rollers mounted on transverse shafts 5 and 6, the mill being pivotally mounted on the shaft 5 so as to swing vertically to a desired angle upward from the frame and to fold when not in use downwardly into the open space between the forward ends of the sills. The shaft 5 is journaled in fixed bearings on the frame, while the shaft 6 is journaled in bearing boxes 7 slidable in arcuate guide slots 8 formed in brackets 9 rising from the front portion of the frame and reinforced by braces 10.

In order to enable the tread-mill to be swung upwardly to a properly inclined position, a transverse winding shaft 11 is journaled on the frame and carries at one end a ratchet wheel 12 engaged by spring-actuated pawls 13 and 14 carried by an operating lever 15, said pawls being arranged to alternately engage the teeth of the ratchet wheel on the opposite swinging movements of the lever, by which a continuous revoluble movement may be imparted to the shaft. Cords or chains 16 pass over supporting pulleys 17 on the respective brackets or standards 9 and each connected at one end with adjacent end of the shaft 6 and at the opposite end to the shaft 11, so that when the lever is operated the cords may be caused to wind upon said shaft 11 to elevate the forward or free end of the tread-mill, to dispose the same in proper position for the action of the draft animals thereon. The ratchet wheel 12 is normally loose on the shaft 11 and its hub is provided with a clutch member 18 for engagement with a clutch member 19 feathered to slide upon and rotate with said shaft, and whereby the ratchet wheel may be coupled to the shaft for the described operation. Said clutch member 19 is connected with a controlling lever 20 pivoted to a bracket arm 21 and carrying a pawl 22 adapted to engage a fixed rack 23, whereby it may be secured in adjusted position. The sliding clutch member carries a friction cone 24 adjustable into and out of engagement with a stationary hollow cone 25 on the frame, said cones forming the members of the brake device by which the descent of the elevated tread-mill may be controlled. When the clutch member 19 is moved away from the clutch member 18, the ratchet wheel 12 will turn loosely on the shaft and the brake member 24 will be engaged with the brake member 25, allowing the operator to readily and conveniently control the gravitative descent of the tread-mill, the cords 16 unwinding from the shaft 11 during this operation. A reverse movement of the clutch member 19 will disengage the clutch elements and restore the parts of the winding mechanism to normal position for subsequent elevation of the tread-mill.

The shaft 5 constitutes a driving shaft for transmitting power from the tread-mill to the elevating conveyer, which comprise a horizontal conveyer 26 and an inclined conveyer 27 pivotally connected thereto, so that said elevators may be folded when not in use into compact form. The elevator 26 is adapted to receive the grain discharging from the wagon and convey the same to the elevator 27, which hoists the grain into a granary or other elevated receptacle. A transmission shaft 28 extends longitudinally at one side of the frame and has its rear end journaled in the frame of the elevator 27 for communicating motion to the latter and connected by a sprocket gearing 29 with the elevator 26, whereby the latter is driven. The forward end of this shaft is provided with a beveled gear 30 meshing with a corresponding gear 31 loose on the shaft 5 and adapted to be connected to and disconnected from the shaft by a suitable clutch device 32 operated by a controlling lever 33 having suitable means for locking it in adjusted position to the frame, by which means the transmission shaft may be thrown into and out of operation whenever desired, thus correspondingly affecting the conveyers 26 and 27.

The front wheels of the loaded wagon are designed to rest upon a vertically movable platform 34 arranged between the inclined approach 3 and the tread-mill 4, said platform being properly spaced from the horizontal conveyer 26 so that the open rear end of the wagon when in dumping position will be arranged immediately above said conveyer for the discharge of its contents thereinto. The platform 34 includes brackets 35 in which are journaled pulleys 36, around which pass hoisting ropes or chains 37, said ropes or chains being secured at one end to hooks 38 on vertical standards or brackets 39 arranged at opposite sides of the frame. The chains pass from said hooks downwardly around the pulleys 36 and thence upwardly over and around pulleys 40 on the brackets and have their opposite ends extending downwardly to and connected with a transverse winding shaft 41, on one end of which is loosely mounted a worm gear 42 meshing with worm threads or a worm gear 43 on the shaft 28. The worm 42 has a clutch collar 44 adapted to be engaged by a clutch member 45 similar in construction to the clutch member 19, said clutch member 45 being feathered to slide upon and rotate with the winding shaft 41 and carrying a friction cone 46 to engage a stationary hollow friction cone 47 on the frame, said cones forming a brake device to control the unwinding movement of the shaft 41.

It will thus be understood that the support or platform 34 is adapted to be elevated by the worm gearing to raise the front end of the wagon and to descend by gravity to normal position. In order to throw the worm gearing out of action when the support has been elevated to a sufficient extent, and to control the gravitative descent of said support, automatic means are provided for controlling the action of the clutch member 45. This automatic means comprises a cam lever 48 having a bell crank lower end 49 fulcrumed upon the frame, one arm of said lever being connected with one of the arms of a horizontal, laterally swinging shifting lever 50, the opposite arm of which lever 50 is forked to engage the groove clutch 45. The body portion of the lever 48 normally extends upwardly at a rearward angle of inclination to the vertical and is provided with upwardly diverging cam slots 51 and 52 communicating at their lower ends with a longitudinal slot 53 and at their upper ends through a cross slot 54, said cam slots being separated by a division piece 55. The adjacent end of the support 34 is provided with a pin or projection 56 to travel in said slots and which normally occupies a seat 57 at the lower end of the slot 53. When the support is lowered and the pin occupies such position, the lever occupies the full line position shown in Fig. 1 and the combined clutch and brake member 45 is in engagement with the clutch member 44 to fix the worm gear to the shaft 41.

In operation, the team is driven onto the elevator frame until the draft animals tread upon the upper stretch of the mill and the front wheels of the wagon bear upon the support 34, at which time the wagon is suitably chocked to hold it from rearward movement, the tread mill elevated to the desired angle of inclination by the pawl and ratchet mechanism, and the conveyers placed in position for operation. The draft animals are then without disconnecting them from the wagon, caused to operate the treadmill, whereby the shaft 5 will be driven and communicate motion to the shaft 28, thus starting the operation of the conveyers. The motion of the transmission shaft also causes the winding shaft 41 to turn through the action of the worm gearing, whereby the chains 37 will be wound thereon, thus elevating the support 34 and the front portion of the wagon so that the latter occupies the proper inclined position for the discharge of the load, the tail gate of the wagon then being open to permit the grain to discharge by gravity into the horizontal conveyer 26. As the support 34 moves upward the pin 56 travels from the slot 53 into the slot 51, thus causing the cam lever 48 to gradually tilt to a vertical position. When the support 34 reaches the desired elevation the lever is tilted sufficiently to operate the lever 50 to withdraw the clutch member 45 from engagement with the worm gear 44 and to throw the brake member 46 into engagement with the brake member 47, thus stopping further upward motion of the support 34 and holding it against descent. As this shifting action occurs, the pin 56 travels from the slot 51 into the upper transverse slot 54 to a position in alinement with the slot 52. The operation of the tread-mill is continued to operate the conveyers until the load is fully dumped and stored, when the clutch 32 is released from the gear 31, thus throwing the conveyers out of action. As soon as the pin 56 comes into alinement with the slot 52, the support 34 begins to gradually descend by gravity, its speed of descent being regulated by the brake devices 45 and 46, and at the same time the cam lever is gradually tilted backward to normal position, until finally, when the load is fully dumped and the pin again passes into the slot 53 the member 45 will be shifted out of engagement with the brake element 46 and into engagement with the worm gear 44, whereby the platform 34 and its controlling parts are restored to normal position. The conveyer 26 is then tilted out of the way and the wagon and draft animals driven forwardly off the platform, and the succeeding teams driven on to the platform and the operation above described repeated. When it is desired to temporarily or permanently throw the apparatus out of operation, the conveyers are folded upon one another and disconnected, if desired, from the shaft 28 and the tread-mill is lowered by gradually releasing the brake member 24 from the brake member 25, whereby in this operation its speed of descent is controlled.

From the foregoing description, taken in connection with the accompanying drawings, the construction and mode of operation of our improved grain elevator will be readily understood, and it will be seen that it provides an apparatus of this character which is comparatively simple of construction, thoroughly efficient in operation and adapted to be easily and conveniently controlled. After the use the apparatus may be readily transported and stored within a barn or other housing until its further use is desired.

Having thus described our invention, we claim:

1. In a device of the character described, the combination of a frame, a tread-mill pivotally mounted thereon, means for elevating the tread-mill including tables and a winding shaft, a ratchet wheel loosely mounted on said shaft, an operating lever provided with a pawl engaging said ratchet wheel, a fixed friction brake member, a combined clutch and movable friction brake member feathered upon the winding shaft, means for adjusting the same to alternately throw the brake mechanism and ratchet wheel into and out of operative position, a conveyer, and gearing for driving the same from the tread-mill.

2. In a device of the character described, the combination of a frame, a tread-mill thereon, a vertically movable support for the front end of a vehicle, a conveyer, gearing for driving the same from the tread-mill, means operative thereby for automatically elevating the support, means for throwing the elevating means out of operation when the support reaches a determined height, and means for controlling the gravitative descent of said support.

3. In a device of the character described, the combination of a frame, a tread-mill thereon, a conveyer, gearing for driving the same from the tread-mill, a vertically movable support for the front end of a vehicle, winding means for elevating said support, gearing operated by the drive gearing for actuating said winding means, means for throwing said actuating gearing out of operation when the support reaches a determined height, and automatic means associated with said gearing for controlling the gravitative descent of said support.

4. In a device of the character described, the combination of a frame, a tread-mill thereon, a conveyer, gearing for driving the same from the tread-mill, winding mechanism for elevating the support, actuating gearing therefor operated by the drive gearing, a brake device for controlling the descent of the support, and means for automatically throwing said actuating gearing out of operation and the brake device into operation when the support reaches a determined height.

5. In a device of the character described, the combination of a frame, a tread mill thereon, a conveyer, gearing for driving the same from the tread-mill, winding mechanism for elevating the support, actuating gearing therefor operated by the drive gearing, a brake device for controlling the descent of the support, and cam-controlled mechanism for automatically throwing said actuating gearing out of operation and the brake device into operation when the support reaches a determined height.

In testimony whereof we affix our signatures in presence of two witnesses.

CALVIN C. STRANGE.
    JOHN M. HOBEN.

Witnesses:
    W. H. COFFEY,
    MICHAEL F. HOBEN.